United States Patent Office 3,476,591
Patented Nov. 4, 1969

3,476,591
WOOD SUBSTRATE COATED WITH A BLEND OF POLYACETAL AND AMINE-ALDEHYDE RESIN
Charles M. Winchester, Butler, and Joseph A. Faccone, Elizabeth, N.J., and Stephen F. Webb, Cincinnati, Ohio, assignors to Interchemical Corporation, New York, N.Y., a corporation of Ohio
No Drawing. Filed Nov. 15, 1966, Ser. No. 594,354
Int. Cl. B44d 1/28
U.S. Cl. 117—148                                    4 Claims

ABSTRACT OF THE DISCLOSURE

Wood substrates coated with a blend of a polyacetal resin prepared by reacting formaldehyde with a polyhydric alcohol having at least three hydroxyl groups in the presence of an acid catalyst and an amine-aldehyde resin. The wood substrates are resistant to solvents and exhibit superior abrasion resistance.

---

This invention relates to novel coated wood structures. More particularly, the present invention relates to wood structures which have very high resistance to solvents, especially common household reagents and superior abrasion resistance. The structures of this invention are particularly valuable as structures to be used for interiors such as house and office paneling. The coated structures are also quite useful in furniture such as desks, tables and counters. The term "wood" as used in this specification and claims is meant to include plywood, fiberboard, and chipboard.

We have found that wood structures having the above-mentioned properties may be prepared by coating on a wood substrate the compositions described in the copending application entitled "Thermosetting Compositions Comprising Blends of Acetal Resins and Amine-Aldehyde Resins," Ser. No. 594,405 filed Nov. 15, 1966 by J. Bernardo and J. Ackerman.

The compositions of said copending application comprise blends of (1) polyacetal resins prepared by reacting an aldehyde with a polyhydric alcohol having at least three hydroxyl groups and (2) amine aldehyde resins selected from the group consisting of urea-formaldehyde resins and melamine-formaldehyde resins.

The polyacetal resins comprise the condensation products of polyhydric alcohols containing at least three hydroxyl groups with the aldehydes in the presence of an acid catalyst. The polyhydric alcohols include glycerine, trimethylolethane, trimethylolpropane, pentaerythritol, dipentaerythritol, sorbitol, erythritol and 1,2,6-hexanetriol.

While formaldehyde is the preferred aldehyde and seems to give the best results, other aldehydes may be used instead of the formaldehyde including acetaldehyde, propionaldehyde and butyraldehyde.

In preparing the polyacetal component, the polyhydric alcohol and the aldehyde are heated at reflux in the presence of the acidic catalyst. No solvent is required for the condensation reaction since the product is liquid at 100% solids. The formation of the condensates of our invention takes place when the components are heated together at temperatures from 100° to 225° C. The by-product of the condensation, water, is distilled out of the mixture and the reaction is terminated when the theoretical amount of water has been collected. During the condensation from about 0.5 to 5.0 moles of aldehyde are preferably employed for each mole of polyhydric alcohol. The acid catalyst preferably constitutes from 0.1 to 3.0% of the total weight of alcohol and aldehyde.

The viscosity of the polyacetal resins and consequently of the blends containing the polyacetal resins has been found to vary with the acid catalysts used. Acid catalysts having pK values of at least 2.12 such as phosphoric acid, phthalic anhydride, citric acid and pelargonic acid may be used to produce polyacetal resins of higher viscosity in the order of from Z to $Z_5$ on the Gardner-Holdt Scale. On the other hand, acids having pK values below 2.12 such as p-toluene sulfonic acid and benzene sulfonic acids may be used to produce polyacetal resins of lower viscosity in the order of G–H on the Gardner-Holdt Scale or lower.

The amine-aldehyde resin which is blended with the polyacetal resin may be any of the standard commercial ureaformaldehyde or melamine-formaldehyde resins including triazineformaldehyde resins such as guanamine-formaldehydes, substituted melamine-formaldehyde resins such as hexamethyl ether of hexamethylol melamine, etc. Etherified urea-formaldehyde and melamine-formaldehyde are also operative in this invention. The amine-aldehyde resins can be made by reaction of an aldehyde (preferably formaldehyde) with a polyfunctional amide, such as urea, biuret, dicyanamides and triazines such as ammeline, melamine, substituted melamines and benzoguanamine.

When the melamine-formaldehyde used in the blend is the hexamethyl ether or hexamethylol melamine, there is a tendency for the resulting viscosity to be lowered below limits which are necessary for many applications. We have found that a desired viscosity can be achieved in such a case by heating the blend of the hexamethyl ether of hexamethylol melamine and the acetal resin until the selected viscosity level is reached. For example, using a polyacetal resin which is prepared with a weak acid catalyst blended with a triazine-formaldehyde, the resulting viscosity is higher than X on the Gardner-Holdt Scale. When the polyacetal resin is blended with hexamethyl ether of hexamethylol melamine, the viscosity is lowered to about "N." This latter blend may be then heated to again increase the viscosity to X or above.

In preparing compositions preferably 50–90% by weight of polyacetal resin is preferably blended with 10–50% by weight of amine-aldehyde resin.

It has been further found that it is advantageous to incorporate higher fatty acids, preferably $C_{12}$ to $C_{18}$ monocarboxylic acids into the acetal resin. This is accomplished by including such fatty acids in the original reaction mixture being condensed to form the acetal resin. Preferably from 0.1 to 2.0 moles of fatty acid are used for each mole of polyhydric alcohol. Some typical higher fatty acids which may be used in the practice of this invention are myristic acid, palmitic acid, stearic acid, oleic acid, ricinoleic acid, linoleic acid, linolenic acid, eleostearic acid, myristoleic acid and palmitoleic acids. The $C_{12}$ to $C_{18}$ fatty acid may be a mixture, e.g., oil fatty acids such as linseed oil fatty acids or dehydrated castor oil, menhaden oil and perilla oil fatty acids, soya bean oil fatty acids as well as coconut oil, castor oil and cottonseed oil fatty acids.

For best results, it is preferable that the composition coated on the wood further contain a vinyl chloride polymer, preferably a vinyl chloride copolymer which is soluble in the coating composition. While vinyl chloride homopolymers may be used, it is preferable that the polymer be a copolymer of vinyl chloride with about 3 to 6% of vinyl acetate. Most preferably the polymer further contains a small amount, in the order of 5 to 8%, of vinyl alcohol.

The following examples will better illustrate the practice of this invention:

EXAMPLE 1

The preparation of a polyacetal resin of trimethylolpropane and formaldehyde in the presence of phthalic anhydride:

Melt 2490 g. of trimethylolpropane by heating to 93° C. and add 465 g. of paraformaldehyde and 45 g. of phthalic anhydride. The mixture is heated at reflux for 3 hours until 297 g. of distillate are collected, the reaction temperature reaches 210° C. The product is a clear liquid with a viscosity of Z-4 on the Gardner-Holdt Scale.

EXAMPLE 2

A reaction mixture of 59.1 parts of trimethylol propane and 29.7 parts of soya fatty acids is heated at 200° C. until the acid number is reduced below 10 and then 10.2 parts of paraformaldehyde and 1.0 part of phthalic anhydride are added. The reaction mixture is heated at reflux, about 100 to 200° C. until about 6 to 7 parts of water have been collected by distillation. The condensation product is a clear viscous liquid with a viscosity of $Z_2$ on the Gardner-Holdt Scale.

EXAMPLE 3

A coating composition is prepared by blending the following components:

| | Parts by weight |
|---|---|
| Polyacetal resin of Example 2 | 21.5 |
| Hexamethyl ether of hexamethylol melamine | 18.3 |
| Xylene | 12.2 |
| Polymekon wax | 7.9 |
| Vinylite VAGH (resin of 91% vinyl chloride, 3% vinyl acetate and 6% vinyl alcohol) | 6.0 |
| Methyl isopropyl ketone | 19.5 |
| n-Butonal | 3.0 |
| p-Toluene sulfonic acid catalyst | 0.7 |

The above composition is roller coated on fiber-board panel and cured at 200° F. for 10 minutes. The coating has excellent gloss, toughness and flexibility.

EXAMPLE 4

A coating composition is prepared by blending the following components:

| | Parts by weight |
|---|---|
| Polyacetal resin of Example 1 | 39.0 |
| Hexamethyl ether of hexamethylol melamine | 31.0 |
| Polymekon wax | 10.0 |
| An alkyd made from 6 parts of glycerol, 14 parts of phthalic anhydride and 20 parts linseed oil | 7.6 |
| Butanol | 3.4 |
| Xylene | 7.0 |
| Ethylhydroxyethyl cellulose | 2.0 |

The above composition is roller coated on wood panel and cured at 200° F. for 10 minutes. The coating has excellent gloss, toughness and flexibility.

We claim:
1. A wood substrate coated with a blend comprising as essential ingredients (1) 50 to 90% by weight of polyacetal resin prepared by reacting formaldehyde with a polyhydric alcohol having at least three hydroxyl groups in the presence of an acid catalyst and (2) 10 to 50% by weight of amine-aldehyde resin selected from the group consisting of urea-formaldehyde and melamine-formaldehyde resins.
2. The article of claim 1 wherein the polyacetal resin further includes a higher fatty acid having from 12 to 18 carbons.
3. The article of claim 1 wherein the blend further included a vinyl chloride polymer.
4. The article of claim 3 wherein said vinyl chloride polymer is a copolymer of vinyl chloride and vinyl acetate.

References Cited

UNITED STATES PATENTS

| 2,269,216 | 1/1942 | McNally | 117—161 |
| 2,433,097 | 12/1947 | Debacher | 117—161 |
| 2,453,569 | 11/1948 | Debacher | 117—161 |
| 2,629,674 | 2/1953 | Ericks | 117—147 |
| 2,643,236 | 6/1953 | Kropa | 117—161 |
| 2,786,081 | 3/1957 | Kress | 117—161 |

WILLIAM D. MARTIN, Primary Examiner

W. R. TRENOR, Assistant Examiner